US012687042B2

(12) United States Patent
Mitchell et al.

(10) Patent No.: US 12,687,042 B2
(45) Date of Patent: Jul. 21, 2026

(54) PANIC BAR LATCH ASSEMBLY

(71) Applicant: Kason Industries, Inc., Newnan, GA (US)

(72) Inventors: Brett Mitchell, Newnan, GA (US); Raymond Hiller, Newnan, GA (US)

(73) Assignee: Kason Industries, Inc., Newnan, GA (US)

( * ) Notice: Subject to any disclaimer, the term of this patent is extended or adjusted under 35 U.S.C. 154(b) by 36 days.

(21) Appl. No.: 18/770,329

(22) Filed: Jul. 11, 2024

(65) Prior Publication Data

US 2026/0015890 A1 Jan. 15, 2026

(51) Int. Cl.
*E05B 65/00* (2006.01)
*E05B 65/10* (2006.01)

(52) U.S. Cl.
CPC ........ *E05B 65/0053* (2013.01); *E05B 65/106* (2013.01)

(58) Field of Classification Search
CPC ............... E05B 65/0053; E05B 65/106; E05B 65/0042; E05B 65/0076; E05B 65/10; E05B 63/246; E05B 63/22; E05B 63/16; E05B 85/14; E05B 7/00; E05B 13/002; Y10T 292/0908; Y10T 292/0822
See application file for complete search history.

(56) References Cited

U.S. PATENT DOCUMENTS 917,685 A 4/1909 Voight
1,029,626 A 6/1912 Palm
1,130,266 A 3/1915 Gold
1,145,590 A 7/1915 Hurd
1,345,041 A 6/1920 Voight
1,386,551 A 8/1921 Bumbarger
1,391,114 A * 9/1921 Huber ................ E05B 65/0042 292/193
1,532,447 A * 4/1925 Schrader ............ E05B 65/0042 292/241
1,534,216 A * 4/1925 Hornung ............ E05B 65/0042 292/255
1,543,078 A * 6/1925 Gloekler ............ E05B 65/0042 292/237

(Continued)

FOREIGN PATENT DOCUMENTS

DE 202004016708 U1 * 1/2005 ......... E05B 65/0053
EP 0164756 A2 * 12/1985 ........... E05B 5/0053

(Continued)

*Primary Examiner* — Steven A Tullia

(74) *Attorney, Agent, or Firm* — Baker, Donelson, Bearman, Caldwell & Berkowitz, PC

(57) ABSTRACT

A panic bar latch release assembly has an inside latch release and an outside pull type handle latch. The handle latch includes a pivotal pull handle and an adaptor having a rounded receiver recess. An elongated push rod is positioned within a push rod channel of the door so as to extend from the inside latch release to the rounded receiver recess of the outside handle latch. The push rod includes a coupler that physically couples the push rod to the interior latch release. The panic bar latch release assembly also includes an outside rod guide that includes an O-ring seal through which the push rod extends to prevent air from passing between the push rod and the door.

17 Claims, 5 Drawing Sheets

(56) References Cited

U.S. PATENT DOCUMENTS

| | | | | | |
|---|---|---|---|---|---|
| 1,578,779 | A | * | 3/1926 | Titus | E05B 65/005 292/164 |
| 1,721,489 | A | | 7/1929 | Prinzler | |
| 1,815,584 | A | | 7/1931 | Prinzler | |
| 2,012,732 | A | * | 8/1935 | Schmidgall | E05B 65/0042 292/226 |
| 2,202,075 | A | | 5/1940 | Yoe | |
| 2,320,298 | A | | 5/1943 | Philips | |
| 2,415,587 | A | | 2/1947 | Groeger | |
| 2,655,395 | A | * | 10/1953 | Groeger | F27B 1/08 292/205 |
| 2,729,486 | A | | 1/1956 | Evans | |
| 2,784,022 | A | | 3/1957 | North et al. | |
| 2,872,233 | A | | 2/1959 | Bordner, Jr. | |
| 2,886,363 | A | | 5/1959 | Blumenthal | |
| 2,968,506 | A | | 1/1961 | Lade | |
| 3,073,142 | A | | 1/1963 | Stebbins | |
| 3,083,560 | A | | 4/1963 | Scott | |
| 3,123,387 | A | | 3/1964 | Jackson | |
| 3,214,947 | A | | 11/1965 | Wikkerink | |
| 3,334,500 | A | | 8/1967 | Bejarano | |
| 3,494,650 | A | | 2/1970 | Slopa | |
| 3,583,740 | A | | 6/1971 | Armstrong | |
| 3,593,550 | A | | 7/1971 | Berkowitz | |
| 3,645,572 | A | | 2/1972 | McFarlane | |
| 3,873,141 | A | | 3/1975 | Peterson | |
| 3,897,092 | A | | 7/1975 | Atkins | |
| 3,940,886 | A | | 3/1976 | Ellingson, Jr. | |
| 3,993,335 | A | | 11/1976 | Schmidt | |
| 4,009,537 | A | | 3/1977 | Hubbard | |
| 4,145,900 | A | | 3/1979 | Ohno | |
| 4,202,573 | A | * | 5/1980 | Berkowitz | E05B 65/0053 292/223 |
| 4,203,622 | A | * | 5/1980 | Cook | E05B 65/0053 292/1 |
| 4,204,369 | A | | 5/1980 | Hubbard | |
| 4,280,725 | A | | 7/1981 | Berkowitz | |
| 4,372,591 | A | | 2/1983 | Cook | |
| 4,382,620 | A | | 5/1983 | Horgan, Jr. | |
| 4,480,451 | A | | 11/1984 | Fujiya | |
| 4,488,378 | A | | 12/1984 | Symon | |
| 4,519,641 | A | | 5/1985 | Fujiya | |
| 4,530,532 | A | | 7/1985 | Fujiya | |
| 4,635,977 | A | * | 1/1987 | Yamada | E05B 65/0053 292/206 |
| 4,704,882 | A | | 11/1987 | Takasaki | |
| 4,714,282 | A | | 12/1987 | Henderson | |
| 4,895,399 | A | | 1/1990 | Horgan, Jr. | |
| 4,986,583 | A | | 1/1991 | Campbell | |
| 5,036,796 | A | * | 8/1991 | deMuy | A01K 1/031 292/302 |
| 5,054,825 | A | | 10/1991 | Mangin | |
| 5,088,786 | A | | 2/1992 | Linder | |
| 5,104,070 | A | * | 4/1992 | Johnson | F16B 5/0208 244/172.4 |
| 5,114,192 | A | | 5/1992 | Toledo | |
| 5,504,974 | A | | 4/1996 | Graber | |
| 5,547,235 | A | | 8/1996 | Dziuk | |
| 5,582,443 | A | | 12/1996 | Finkelstein | |
| 5,947,534 | A | | 9/1999 | Zarzycki, Jr. | |
| 6,145,897 | A | | 11/2000 | Locher | |
| 6,526,788 | B2 | * | 3/2003 | Finkelstein | E05B 65/0053 292/147 |
| 6,641,183 | B2 | | 11/2003 | Brown | |
| 6,953,211 | B2 | | 10/2005 | DiVinadio | |
| 7,044,513 | B2 | * | 5/2006 | Witiak | E05B 17/002 292/DIG. 31 |
| 9,068,376 | B2 | | 6/2015 | Mitchell | |
| 9,995,060 | B2 | | 6/2018 | Miller | |
| 10,047,555 | B2 | * | 8/2018 | Link | E05D 15/56 |
| 10,662,671 | B2 | | 5/2020 | Stallbaumer | |
| 11,193,311 | B2 | * | 12/2021 | Grewe | E05B 65/1006 |
| 11,261,628 | B2 | * | 3/2022 | Mitchell | E05B 65/0053 |
| 2010/0109352 | A1 | | 5/2010 | Tien | |
| 2014/0225384 | A1 | * | 8/2014 | Wall | E05C 19/18 292/281 |
| 2017/0130485 | A1 | * | 5/2017 | Dodge | E05B 17/0075 |

FOREIGN PATENT DOCUMENTS

| | | | | | |
|---|---|---|---|---|---|
| FR | 2491602 | A1 | * | 4/1982 | E05B 13/10 |
| FR | 2891858 | A1 | * | 4/2007 | E05B 53/00 |
| GB | 514386 | A | * | 11/1939 | E05B 17/007 |
| GB | 2589935 | A | * | 6/2021 | F16B 5/123 |
| JP | S613869 | U | * | 1/1986 | E05B 65/06 |
| KR | 890001203 | Y1 | * | 3/1989 | E05B 65/0042 |
| KR | 200206895 | Y1 | * | 12/2000 | E05B 65/0042 |
| KR | 100321873 | B1 | * | 1/2002 | E05B 65/0053 |
| KR | 200318677 | Y1 | * | 7/2003 | E05B 65/0053 |
| KR | 100890020 | B1 | * | 3/2009 | E05B 65/0053 |
| KR | 20090091632 | A | * | 8/2009 | E05B 17/20 |
| KR | 100970190 | B1 | * | 7/2010 | E05C 3/14 |
| KR | 20110000242 | U | * | 1/2011 | E05B 15/00 |
| KR | 20130043837 | A | * | 5/2013 | E05B 65/0053 |
| KR | 102067569 | B1 | * | 1/2020 | E05B 63/0056 |

* cited by examiner

PANIC BAR LATCH ASSEMBLY

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

TECHNICAL FIELD

This invention relates to latch releases, and specifically to an interior latch release in the form of an elongated bar.

BACKGROUND OF THE INVENTION

Walk-in cold rooms, such as walk-in coolers, freezers, or other refrigerated environments, are common in various industries, including supermarkets and grocery stores, commercial kitchens, and other food service facilities. They typically have one or more access doors for entry and exit from the environment.

A problem associated with a cold-room door is the possibility that a person may become enclosed within the cold-room. To resolve this potential problem the door is provided with an inside release designed to release the latch on the opposite side of the door. The inside release may be in the form of a knob having a threaded rod which mounts the latch to the cold room door. A problem with this type of device is that a person in a panicked state within the cold room may not realize that turning the internal knob releases the latch and allows egress from the cold-room.

Another problem with these types of releases is that some people may not have the hand strength or dexterity to turn a tightened knob type release.

Some bar type latches have been designed which allow a person to simply push upon an elongated horizontal bar to operate a latch. These types of bar latches operate by directly actuating the release mechanism of the latch, i.e., the bar is directly coupled to the strike which prevents the opening of the door. This type of bar latch is shown in U.S. Pat. Nos. 5,947,534; 5,547,235; 3,897,092, and 2,320,298. These types of bar latches directly operate the strike through linkage which may become inoperable over time due to wear. Another similar type of latch in shown in U.S. Pat. No. 11,193,211. This latch utilizes a push rod floatably extending between an interior latch release and an exterior latch. This push rod is not physically coupled to either the interior latch release or the exterior latch. The floating configuration of this push rods may cause the push rod to not return to its initial position with the returning action of the interior latch release. Another problem is that air may pass between the door and the push rod, causing the formation of ice that may prevent movement of the push rod.

Accordingly, it is seen that a need exists for a panic bar latch release which is easier for people to recognize and operate. It is to the provision of such therefore that exemplary embodiments of the present invention are primarily directed.

SUMMARY OF THE INVENTION

A panic bar latch assembly coupleable to a door. The panic bar latch assembly comprises an exterior handle latch having a pivotal handle; an interior latch release having two bar mounts coupled to the door, an elongated push bar extending between the two bar mounts, and a push rod having a first end operatively coupled to the pivotal handle and an oppositely disposed second end operatively coupled to the push bar wherein movement of the push bar causes the push rod to pivotally bias the handle of the exterior handle latch, the second end having a coupler physically connecting the second end to the interior latch release. The panic bar latch assembly may include an adaptor having a rounded push rod receiver recess, wherein the push rod first end is rounded and received within the rounded push rod receiver recess. The panic bar latch assembly may also include an outside rod guide having a seal to prevent the passage of air between the push rod and the door.

DETAILED DESCRIPTION

With reference to the drawings, there is shown a panic bar latch release or venting assembly 10 for walk-in cold rooms according to the present invention. The panic bar latch release assembly 10 includes an interior or inside latch release 11, mounted to an inside surface of the door and which is used in conjunction with an exterior or outside pull type handle latch 12 mounted to an outside surface of the door D of a walk-in cold room within a surrounding wall to control and/or restrict opening of the door D and access the walk-in cold room.

Figure 6:
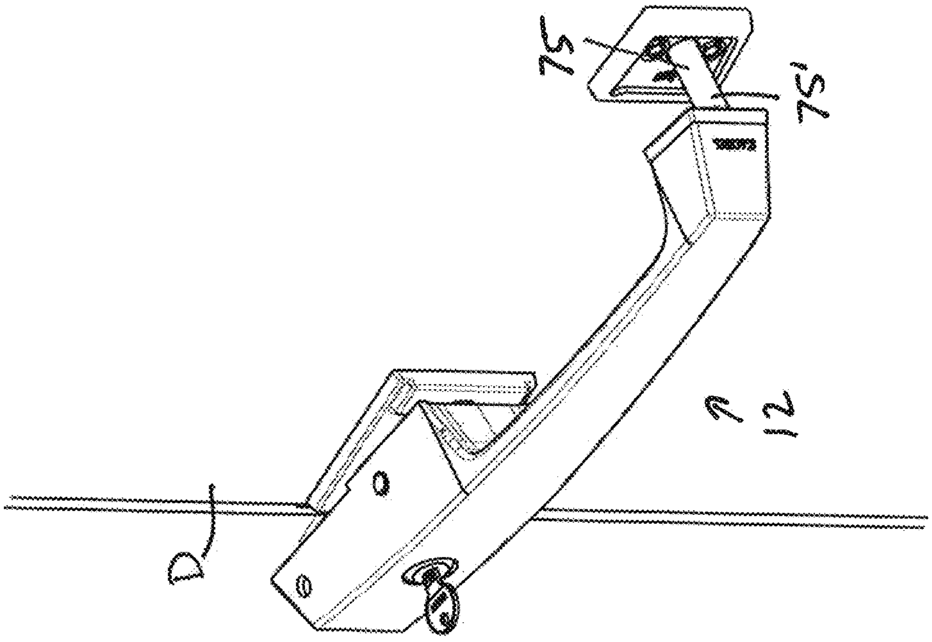
FIG. 6 is a perspective view of the exterior handle latch of the panic bar latch release assembly of FIG. 1, shown mounted to a door in an open position.

The pull type handle latch 12 includes a main housing 15 having a lever type pull handle 16 extending from the main housing 15 so that the bearing end 18, distal the pull handle 16, bears against the door jamb to pry the door open when the latch 12 is pivoted to its open position shown in FIG. 6. An adapter 19 is mounted to an end to the handle 16 through a screw 20. The adapter 19 includes a conical or rounded push rod landing, recess or receiver 21. The latch 12 also includes an outside rod guide 23 having a push rod opening 24 and two mounting holes 25 therethrough. Two mounting screws 26 mount the outside rod guide 23 to the outside surface of the door D. The outside rod guide 23 also includes a resilient O-ring 27 mounted concentrically within or about the push rod opening 24. The push rod opening 24 and conical receiver 21 of adapter 19 are aligned with a push rod channel C extending through the door D between its exterior surface and the interior surface.

The latch 12 also includes a handle mount 28 having a lug portion 29 with a pivot hole 33 receiving a pivot pin bushing 35 that in turn receives a handle pivot pin 36. The handle 16 is pivotal about pivot pin 36 between a locked, latched or closed position (shown in FIG. 2) and an unlocked, unlatched or open position (shown in FIG. 6) in conventional fashion. A handle return spring 41 is positioned between the main housing 15 and the handle mount 28 to bias the handle 16 towards its latched or closed position.

The inside latch release 11 includes a first bar mount 30, a second bar mount 31, and an elongated push bar 32 coupled to and extending between the first bar mount 30 and the second bar mount 31. The first and second bar mounts 30 and 31 are mounted to the interior surface of the door D. The inside latch release 11 is the same as that shown in U.S. Pat. No. 11,193,311 B2 that is incorporated herein by reference in its entirety.

The first bar mount 30 has a support bracket 34. The support bracket 34 has screw mounting holes 38 through which mounting screws extend to mount the support bracket 34 to the door D.

The support bracket 34 has a tongue 37 with an extended portion or plate 39 with a push rod guide hole 40 extending therethrough. The push rod guide hole 40 is aligned with the push rod channel C. The support bracket has unshown screw mounting holes which are threaded to received threaded mounting screws 42.

A cover or body portion 44 is coupled to the support bracket 34. The body portion 44 has mounting holes 45 which are aligned with the support bracket screw mounting holes. Mounting screws 42 pass through the mounting holes 45 and are threadably received within screw mounting holes to lock or fix the body portion 44 to the support bracket 34.

The body portion 44 also includes two mounting bolsters, seats, or flanges 47 having pivot pin mounting holes 48 therethrough. A handle mount channel 49 extends between the two mounting flanges 47 and into the body portion 44.

A handle mount 54 is pivotally coupled to the body portion 44 through a pivot pin 55 that extends through a pivot pin mounting hole 57 extending through the handle mount 54 and the pivot pin housing holes 48 of the body portion 44. The pivot pin housing holes 48 may be fitted with a pair of unshown bushings therein to provide easier movement between the pivot pin 55 and the handle mount 54. An unshown coil spring is journalled upon the pivot pin 55 and coupled between the handle mount 54 and body portion 44 so as to bias the handle mount 54 towards its outwardly extending, unengaged position, shown in FIGS. 2, 3 and 4. The handle mount 54 also includes a handle mounting portion 65 having an elongated arm 66 and a handle bar opening 67. The arm 66 of the handle mount 54 also includes a rounded, push rod hole, recess, or receiver 73 facing the door D.

An elongated push rod 75 is positioned within the push rod channel C of the door D so as to extend through the push rod guide hole 40 of the support bracket extended portion 39. The push rod 75 has a round configuration or round lateral cross-section. The push rod 75 has a rounded first end 75' which is coupled to, contacts, or engages the conical receiver 21 of the adaptor 19, and a rounded second end 75" which is coupled to, contacts, or engages the handle mount 54 at the push rod receiver 73. The push rod second end 75" includes a retention pin 76 and a spring biasing push rod guide 77 journalled upon the push rod 75 and coupled to the retention pin 76. The push rod guide 77 has two oppositely extending ends or tangs 78 that are received within tang mounting holes 79 in handle mounts 54. The push rod guide 77 maintain the coupling of the push rod 75 with the handle mounts 54, i.e., it prevents separation therebetween. The push rod guide 77 is made of a spring metal or material flexible wire.

The second bar mount 31 is essentially of the same or similar construction as the first bar mount 30.

The elongated push bar 32 is coupled to and extends between the first and second bar mounts 30 and 31. The ends of the push bar 32 are positioned within the handle openings 67. A set screw is threaded to engage and fix the position of the push bar 32 relative to the bar mounts 30 and 31. A cap 81 is fitted to the handle openings 67 to seal the openings and interior of the push bar 32.

An optional and conventionally known threaded release device 80 may be coupled to the exterior handle latch 12 to release the entire handle latch 12 from the door in an emergency situation to allow opening of the door.

In use, the exterior pull type handle latch 12 is mounted to the exterior surface of a door and the inside latch release 11 is mounted to the interior surface of the door D. The push rod 75 extends through the push rod channel C within the door thereby actuatingly or operably coupling the exterior handle latch 12 to the inside latch release 11.

To open the door D from the exterior of the cold room a person need only grasp the pivotal handle 16 of the handle latch 12 and pull it towards themselves or away from the door D. The actuation of the pivotal handle 16 moves the distal bearing end 18 against the door jamb to pry open the door D, this prying action multiplies the applied manual force placed upon the handle 16 to ensure the opening of the door D against any vacuum force or any other force attempting to maintain the door in a closed position.

Figure 1:
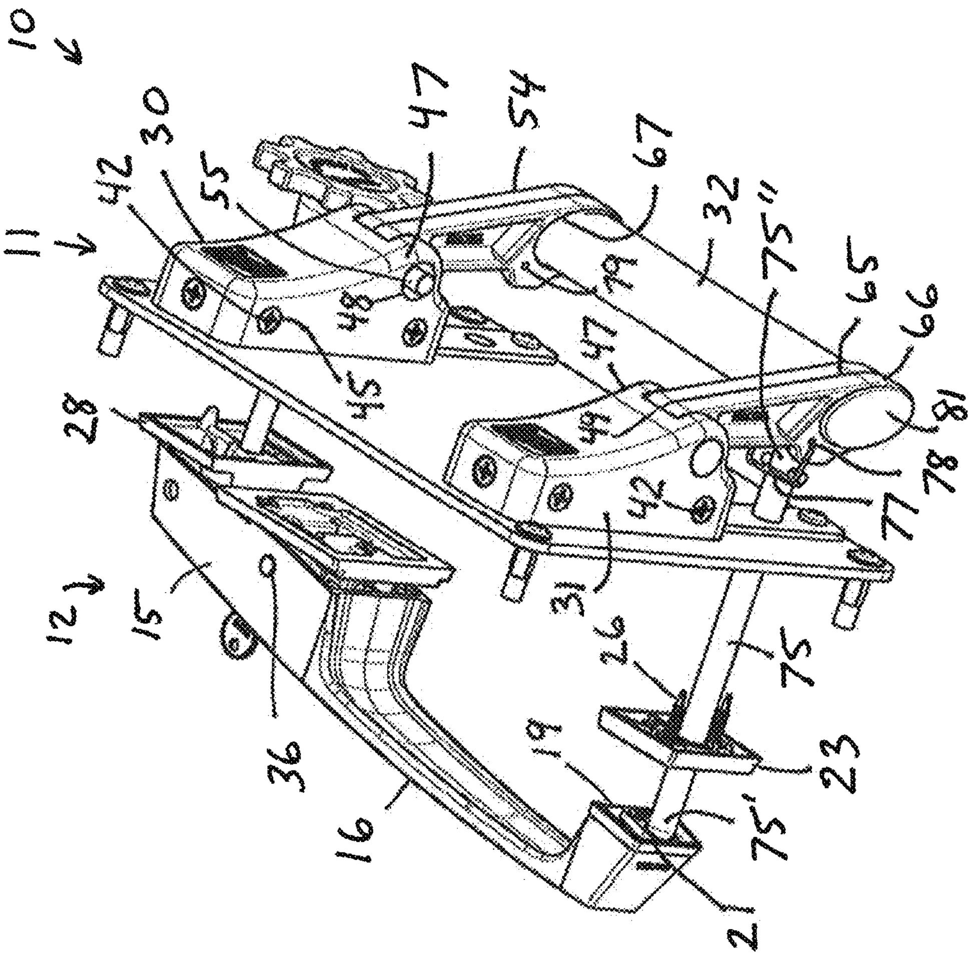
FIG. 1 is a perspective view of a panic bar latch release assembly.
Figure 2:
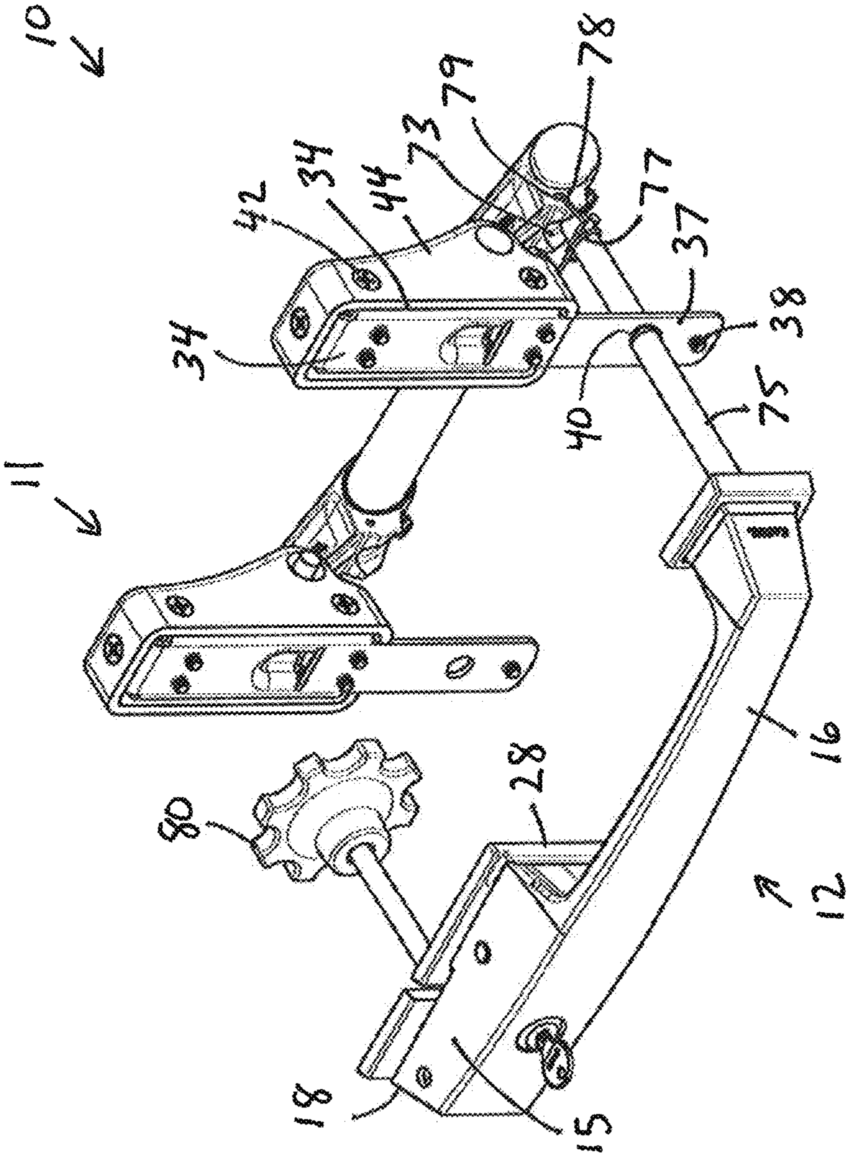
FIG. 2 is a perspective view of a panic bar latch release assembly of FIG. 1.
Figure 3:
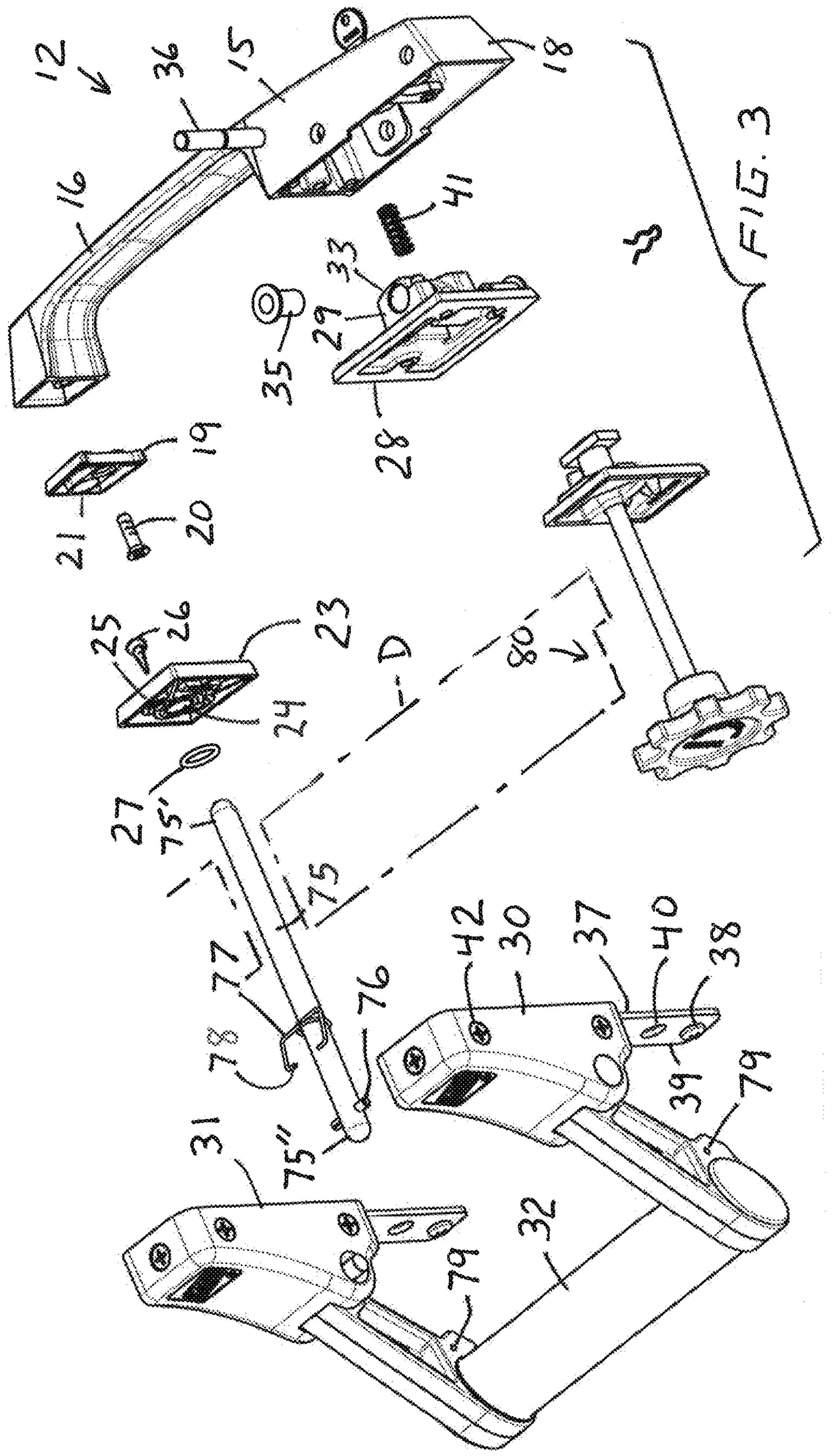
FIG. 3 is an exploded side view of the panic bar latch release assembly of FIG. 1, shown with schematic illustrations of the position of a door.
Figure 5:
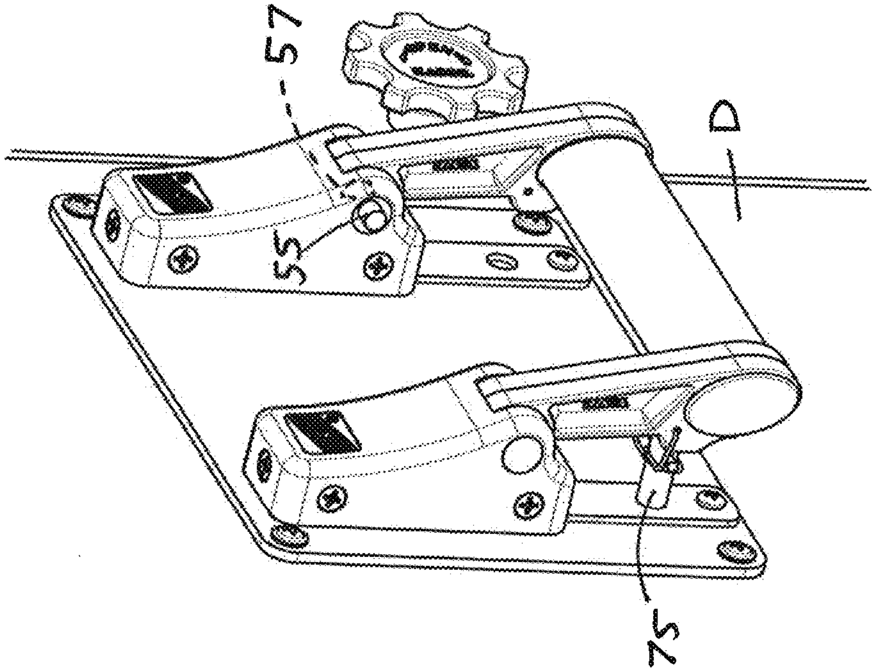
FIG. 5 is a perspective view of the interior latch release of the panic bar latch release assembly of FIG. 1, shown mounted to a door in a retracted position.
Figure 4:
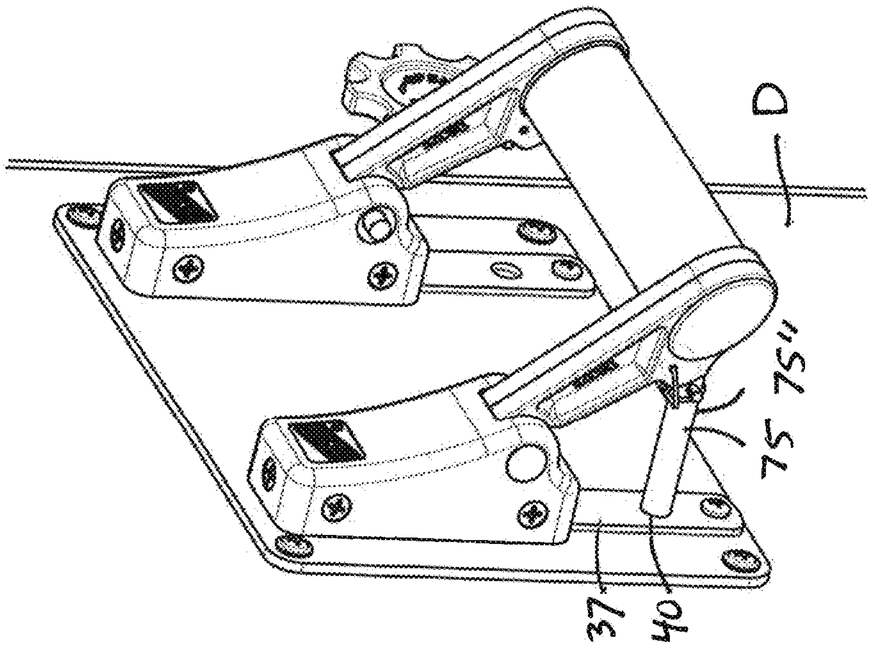
FIG. 4 is a perspective view of the interior latch release of the panic bar latch release assembly of FIG. 1, shown mounted to a door in an extended position.

To open the door D from the interior of the cold room a person may push anywhere on the elongated push bar 32, thereby pivoting the handle mounts 54 from the door closed position shown in FIGS. 2, 3 and 4, toward the door and to their engaged or door open position shown in FIGS. 1 and 5. The pivoting of the handle mounts 54 causes the push rod 75 to be forced in a direction towards the exterior handle latch 12.

The contact of the first end 75' of the push rod 75 against the conical receiver 21 of adapter 19 of the exterior handle latch 12 causes the pivotal handle 16 to pivotally move away from the door D resulting in the pivoting of the distal bearing end 18 in a direction towards the door to its unlatched, unlocked or engaged position prying the door D to an opened position. This movement of the latch handle 16 is essentially the same as if someone was directly pulling the pivotal handle 16 from the exterior side of the door. Thus, the movement of the pivotal handle 16 to its open or unlatched position opens the door D.

Once the latch release 11 is released by the person or operator, the unshown internal coil spring forces the handle mounts 54 and bar 32 to pivot about pivot pins 55 back to their initial, extended, closed positions.

As shown, the panic bar latch assembly is coupleable to a door D and includes an exterior handle latch 12 operable between a latched position latching the door and an unlatched position unlatching the door. The latch assembly also includes an interior latch release 11 having a bar mount and an elongated push bar coupled to the bar mount for movement between an extended position and a retracted position. Lastly, the latch assembly includes a push rod extending through the door having a first end coupled to the exterior latch and a second end coupled to the interior latch release. With this construction, the movement of the interior latch release from the extended position to the retracted position causes the push rod to move towards the exterior latch thereby forcing the exterior latch (handle) to move from the latched position to the unlatched position.

It should be understood that the handle mount 54 may be considered to be either part of the bar mounts 30 and 31 or part of the elongated bar 32.

An advantage of the present system is that the conical shaped receiver 21 allows the push rod rounded first end 75' to ride on the cone sides as the handle pivots. This avoids the common problem of handle rotation causing misalignment with the push rod because of the arcuate movement of the handle. The round end to cone surface additionally minimizes loading on the push rod during the actuation process.

Another advantage is the present invention is the inclusion of the outside rod guide 23 with its O-ring 27 that seals the push rod opening 24 to avoid the common problem of the rod freezing in place due to the intrusion of moisture and subsequent freezing of the moisture between the push rod and push rod opening.

Another advantage of the present invention is the inclusion of the push rod guide 77 on the push rod 75. The push rod guide allows the push rod 75 to be physically attached to the handle mount 54 that allows the push rod 75 to pivot freely while ensuring that the push rod does not become separated from the handle mount 54. This also ensures that the push rod is pulled back through the door to allow the latch 12 to reset and return to the rest position, as the spring biasing force associated with the returning of the latch 12 may not be adequate to do so and thus the additional biasing force of the returning inside latch release may be used. Alternatively, the push rod may be coupled to either the latch release or the latch through other types of couplers, such as ball and joint couplers, flexible straps, or other flexible means.

Another advantage of the present system is that the interior push bar 32 provides a person with a highly recognizable latch release for a door. This is important when a person is under great duress or in a panicked mode.

Another advantage of the present system is that the elongated bar provides a large contact area for a person. This large contact area is important in providing greater leverage, the ability to place more than one hand on the handle release, and a large target area should the interior of the cold room have little or no interior light.

The interior latch release 11 is separate and apart from the exterior handle latch 12. Therefore, if the exterior handle latch is in need of replacement, it can be replaced without the need of also replacing the interior latch release 11, or visa-versa. Also, the interior latch release 11 does not include the linkage or mechanism necessary to move the latch bolt. This absence of the latch bolt and its linkage is an advantage over the prior art bar type latches which directly unlatch the door.

It should be understood that the pivoting motion of the elongated push bar or its handle mounts may be equated with a push bar which is pushed in a straight line rather than an arc.

It should be understood that as used herein the position of the inside latch release may be referenced herein as being in a first, initial, extended, unengaged, latched, locked, or closed position as this relates to the door being closed, and being in a second, retracted, unlatched, unlocked, opened, or open position as this relates to the door being open. Similarly, the exterior handle latch may be referenced herein as being in a first, initial, unengaged, latched, locked, or closed position as this relates to the door being closed, and being in a second, retracted, unlatched, unlocked, or open position as this relates to the door being open.

It should be understood that the foregoing descriptions merely relate to exemplary, illustrative embodiments of the invention. Therefore, it should also be understood that various modifications may be made to exemplary embodiments described herein that are within the scope of the invention, which will be recognized by one of ordinary skill in the art in light of the disclosure herein. Furthermore, various elements of the described exemplary embodiments of the invention may be known in the art or recognized by one of ordinary skill in the art based on the disclosure herein.

The invention claimed is:

1. A panic bar latch assembly coupleable to a door, the panic bar latch assembly comprising:

an exterior handle latch having a pivotal handle;

an interior latch release having at least one bar mount coupled to the door, an elongated push bar extending between said at least one bar mount, and a push rod having a first end operatively coupled to said pivotal handle and an oppositely disposed second end operatively coupled to said at least one bar mount of said interior latch release wherein movement of said at least one bar mount causes the push rod to pivotally bias the pivot handle of the exterior handle latch, said second end having a coupler physically fixedly connecting said second end to said interior latch release to prevent said push rod from separating from said interior latch release.

2. The panic bar latch assembly of claim 1 wherein said coupler is a flexible wire push rod guide coupled to said push rod and said interior latch release.

3. The panic bar latch assembly of claim 1 wherein said exterior handle latch includes an adaptor having a rounded push rod receiver recess, and wherein said push rod first end is rounded and received within said rounded push rod receiver recess.

4. The panic bar latch assembly of claim 1 further comprising an outside rod guide having a seal to prevent the passage of air between said push rod and the door.

5. The panic bar latch assembly of claim 4 wherein said push rod has a round configuration and wherein said seal is an O-ring seal.

6. The panic bar latch assembly of claim 4 wherein said exterior handle latch includes an adaptor having a rounded push rod receiver recess, and wherein said push rod first end is rounded and received within said rounded push rod receiver recess.

7. A panic bar latch assembly coupleable to a door, the panic bar latch assembly comprising:

an exterior handle latch operable between a first position with the door closed and a second position with the door open, wherein said exterior handle latch includes an adapter having a rounded push rod receiver recess;

an interior latch release for movement between an extended position and a retracted position, and a push rod extending through the door between said exterior handle latch and said interior latch release, said push rod having a first end cooperating with said exterior handle latch and a second end physically fixedly connecting said push rod to said interior latch release wherein movement of said interior latch release from said extended position to said retracted position causes said push rod to move towards said exterior handle latch to force the exterior handle latch to move from the door closed position to the door open position, and wherein said push rod first end is rounded and received within said rounded push rod receiver recess.

8. The panic bar latch assembly of claim 7 further comprising a coupler extending between said push rod second end and said interior latch release.

9. The panic bar latch assembly of claim 8 wherein said coupler is a flexible wire push rod guide coupled to said push rod and said interior latch release.

10. The panic bar latch assembly of claim 7 further comprising an outside rod guide having a seal to prevent the passage of air between said push rod and the door.

11. The panic bar latch assembly of claim 10 wherein said push rod has a round configuration and wherein said seal is an O-ring seal.

12. The panic bar latch assembly of claim 10 wherein said interior latch release includes a rounded receiver, and wherein said push rod second end is rounded and received within said rounded receiver.

13. A panic bar latch assembly coupleable to a door, the panic bar latch assembly comprising:

an exterior handle latch operable between a first position with the door closed and a second position with the door open;

an interior latch release for movement between an extended position and a retracted position;

a push rod extending through the door between said exterior handle latch and said interior latch release, said push rod having a first end cooperating with said exterior handle latch and a second end including a coupler having a first portion fixedly mounted to the push rod and a second portion fixedly mounted to the interior latch release physically and fixedly connecting said push rod to said interior latch release wherein movement of said interior latch release from said extended position to said retracted position causes said push rod to move towards said exterior handle latch to force the exterior handle latch to move from the door closed position to the door open position, and an outside rod guide having a seal to prevent the passage of air between said push rod and the door.

14. The panic bar latch assembly of claim 13 wherein said push rod has a round configuration and wherein said seal is an O-ring seal.

15. The panic bar latch assembly of claim 13 wherein said exterior handle latch includes an adaptor having a rounded push rod receiver recess, and wherein said push rod first end is rounded and received within said rounded push rod receiver recess.

16. The panic bar latch assembly of claim 13 wherein said coupler is a flexible wire push rod guide coupled to said push rod and said interior latch release.

17. The panic bar latch assembly of claim 13 wherein said exterior handle latch includes an adaptor having a rounded push rod receiver recess, and wherein said push rod first end is rounded and received within said rounded push rod receiver recess.

* * * * *